June 28, 1966     E. G. THEM     3,258,565

TIME DELAY RELAY

Filed Feb. 3, 1964     2 Sheets-Sheet 1

INVENTOR.
EDWARD G. THEM

BY

ATTORNEYS

June 28, 1966  E. G. THEM  3,258,565

TIME DELAY RELAY

Filed Feb. 3, 1964  2 Sheets-Sheet 2

INVENTOR.
EDWARD G. THEM

ATTORNEYS

3,258,565
TIME DELAY RELAY
Edward G. Them, Mansfield, Ohio, assignor to Therm-O-Disc, Incorporated, Mansfield, Ohio, a corporation of Ohio
Filed Feb. 3, 1964, Ser. No. 342,120
15 Claims. (Cl. 200—122)

This invention relates generally to an electric relay for closing a switch for a predetermined time after a predetermined delay subsequent to the cut off of the supply of electrical current to the relay. More particularly, this invention relates to such a time delay relay wherein the switch is actuated to a closed position in response to the cooperation of a resistor generating heat in response to conduction, and two mutually compensating thermally responsive bimetallic members, and switch biasing means responsive to the motion of the thermally responsive bimetallic members.

It is an object of this invention to provide apparatus for closing a switch after a predetermined time delay following disengagement of the switch closing means from a source of electric current, retaining the switch in a closed position for a predetermined time after actuation of the switch to closed position, wherein the supply of electric current in engagement with the switch closing means is voltage regulated within predetermined limits, and the switch closing means is responsive to circuit components having substantially linear current to voltage characteristics when electricity is supplied thereto.

It is another object of this invention to provide apparatus for closing a switch after a predetermined time delay following disengagement of the switch closing means from a source of electric current, retaining the switch in a closed position for a predetermined time after actuation of the switch to a closed position, wherein the supply of electric current in engagement with the switch closing means is responsive to circuit components having substantially linear current to voltage characteristics when electricity is supplied thereto, and wherein the conditioning of operation of the switch closing means is responsive to the movement of an overcenter spring, induced by thermally responsive means, in moving one of the contacts of the switch towards a closed position.

It is another object of this invention to provide apparatus for closing a switch after a predetermined time delay following disengagement of the switch closing means from a source of electric current, retaining the switch in a closed position for a predetermined time after actuation of the switch to closed position, wherein the supply of electric current in engagement with the switch closing means is voltage regulated within predetermined limits, and the switch closing means is responsive to circuit components having substantially linear current to voltage characteristics when electricity is supplied thereto, and having means for limiting travel of an overcenter spring about its center, the spring being operable to condition the switching means for actuation.

It is another object of this invention to provide apparatus for closing a switch after a predetermined time delay following disengagement of the switch closing means from a source of electric current, retaining the switch in closed position for a predetermined time after actuation of the switch to closed position wherein the switch closing means is responsive to a pair of cooperating thermally responsive members, wherein one of the thermally responsive members is in series with means generating heat from electric conduction, and the heat generating means has a shorter path of thermal conduction to this one member than the other.

There is still another object of this invention to provide apparatus for closing a switch after a predetermined time delay following disengagement of the switch closing means from a source of electric current, retaining the switch in closed position for a predetermined time after actuation of the switch to a closed position, wherein the supply of electric current is engaged with the switch closing means in response to a pair of thermally responsive members, wherein one of the thermally responsive members is in series with the switch of predetermined time actuation.

There is still another object of this invention to provide time delay relay apparatus wherein a switch is provided in a circuit conducting electrical current to means for generating heat in response to electric conduction, and this switch is biased closed by means in electric series therewith and deactuated in closing this switch in response to movement of thermally responsive means in electric series with the means generating heat, the movement induced in response to electric conduction therethrough.

It is still another object of the invention to provide apparatus for closing a switch after a predetermined time delay following disengagement of the switch closing means from a source of electric current, retaining the switch in a closed position for a predetermined time after actuation of the switch to closed position, wherein the supply of electric current engaged with the switch closing means is responsive to circuit components having substantially linear current to voltage characteristics when electricity is supplied therto, and another switch, normally closed prior to the supply of the electrical current to the apparatus, and opening after a predetermined time interval subsequent to the supply of electrical energy to the apparatus, and closing after the cut off of such electric supply from the apparatus.

It is still another object of this invention to provide apparatus for closing a switch after a predetermined time delay following disengagement of the switch closing means from a source of electric current, retaining the switch in a closed position for a predetermined time after actuation of the switch to closed position, wherein the supply of electric current engaged with the switch closing means is responsive to circuit components having substantially linear current to voltage characteristics when electricity is supplied thereto, wherein a normally closed switch is both opened and closed by movement of thermally responsive means. These and other objects and advantages of this invention, not at this time pointed out, will become more apparent and better understood from the following detailed description taken in conjunction with the accompanying drawings, wherein like reference numerals denote common characteristics and wherein:

Figure 1:
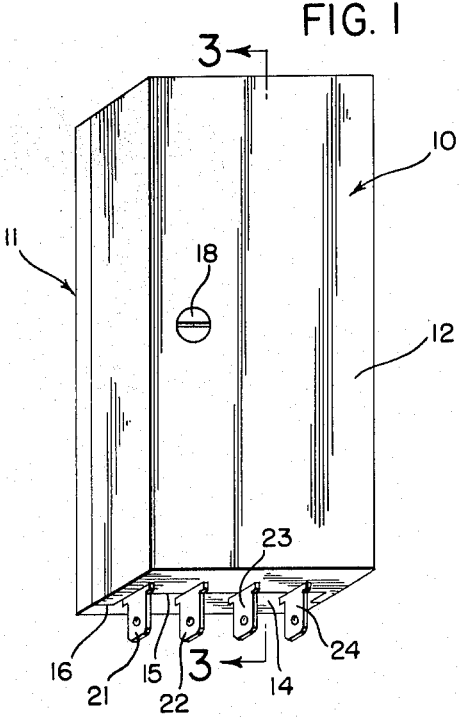
FIGURE 1 is a perspective view of the preferred embodiment of my invention.
Figure 2:
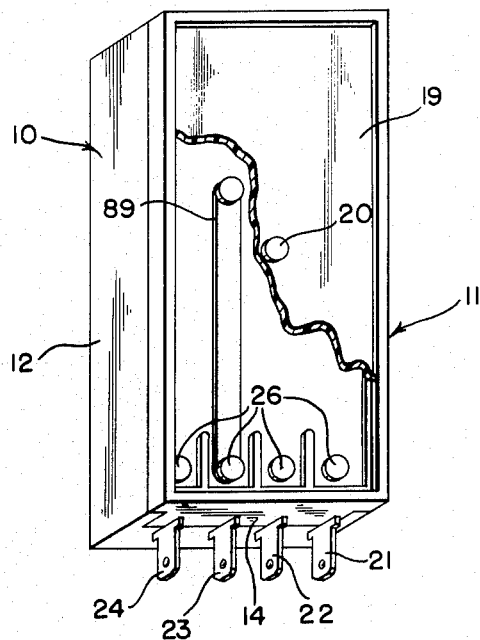
FIGURE 2 is another perspective view of the preferred embodiment of this invention with a portion of the bottom cover cut away to show apparatus within the housing.
Figure 3:
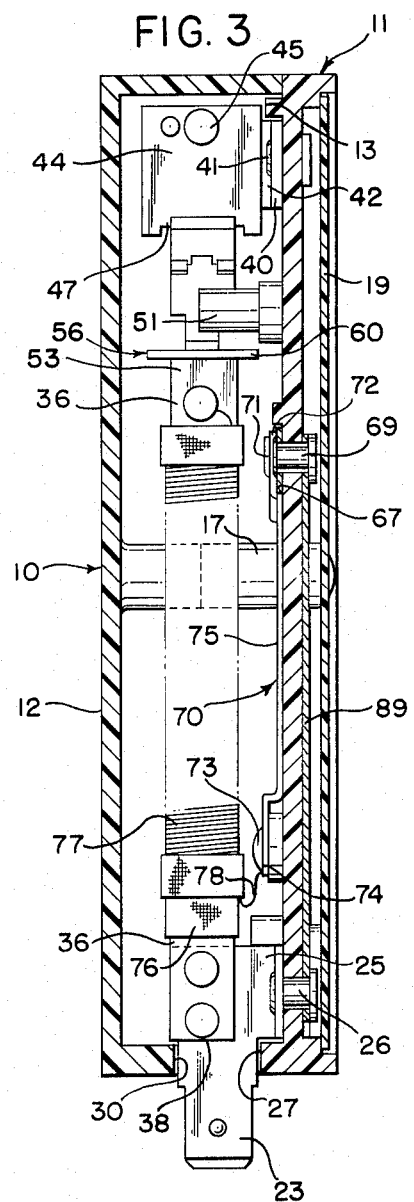
FIGURE 3 is a longitudinal sectional view on an enlarged scale of the apparatus shown in FIGURE 1 taken on the line 3—3 of FIGURE 1.

With reference to the drawings, FIGURE 1 is a view of the exterior of the time delay relay apparatus of the present invention including a housing 10, having base 11, and a cover 12, both being electrically and thermally insulatory and preferably composed of a phenolic condensation molding. The cover 12 mates with the base 11 on ridges 13 and 14, shown in FIGURE 4, there mounting flush between ridges 14 of base 11 and surfaces of cover 12, the edges of which are shown in FIGURES 1 and 5 at 15 and 16 respectively. A hollow upstanding cylindrical boss 17 molded on base 11, has threads on the interior wall thereof for receiving a screw 18 passing through cover 12, and cooperating therewith to secure the cover 12 to the base 11, as shown in FIGURE 5. A cover plate 19, shown in FIGURE 2, is secured to the bottom of base 11 by means of a fastener 20.

The housing 10 defines a thermally and electrically insulated chamber for the apparatus of the device, with the exception of terminals 21, 22, 23 and 24, projecting to the exterior thereof. In addition, the housing 10 excludes dirt and dust from its interior, but may be readily disassembled by simply unscrewing the screw 18 and lifting the cover 12 from base 11, for access to the apparatus mounted in the interior of the housing 10.

The terminals 21, 22, 23 and 24 are projections of the L-shaped brackets 25, each of which is transversely spaced and separately secured to the base 11 by means of the rivets 26. Each of the terminals 21, 22, 23 and 24, projects through slots 27 formed in ridge 14 on the end of base 11, and is flush with the walls of the slots 27. Each of the terminals 21, 22, 23 and 24 is insulated from the others by portions 28 of ridge 14, and the end wall of cover 12 having slots 30 complementary to slots 27 of base 11, and cooperating in a similar fashion with the terminals 21, 22, 23 and 24.

Terminals 21, 23 and 24 have longitudinally extending, flexibly yielding metal strips 31, 33 and 34, respectively, rigidly secured thereto by one of the brass rivets 32. In addition, terminals 22 and 23 have bimetallic metal strips, 35 and 36, respectively, each fixedly secured thereto by means of rivets 32 to ends 37 and 38, respectively, thereof.

Bimetallic strip 36 is positioned at a distance from terminal 23, and electrically conductive therewith, by means of copper spacers 39 in contact therewith and located therebetween.

Figure 4:
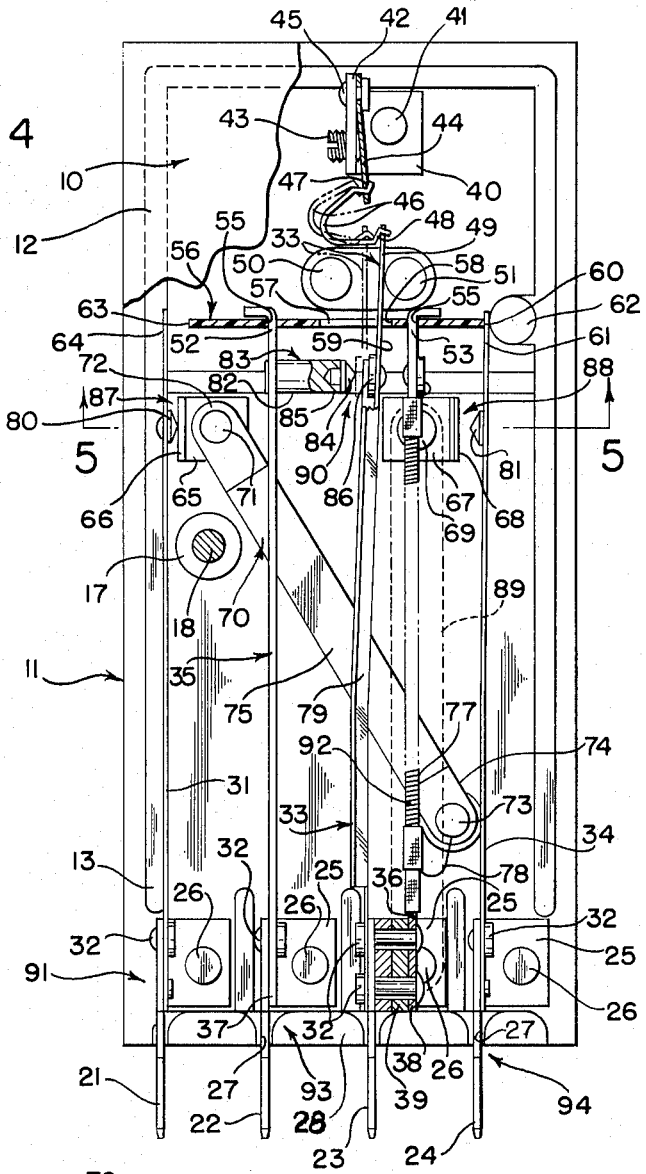
FIGURE 4 is a top plan view of the apparatus shown in FIGURE 3 wherein a portion of the cover member of the housing is cut away to show the apparatus mounted on the base member of the housing.
Figure 5:
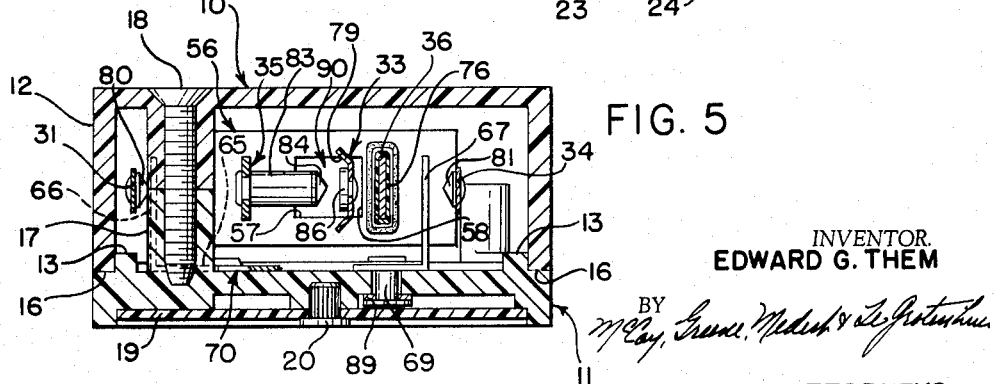
FIGURE 5 is a transverse sectional view taken on the line 5—5 of FIGURE 4.

As shown in FIGURE 4, right angle bracket 40 is mouted on base 11 by means of a rivet 41. On arm 42 of bracket 40, a screw 43 is threadably engaged and passes therethrough to a leaf spring 44 biased there against. The leaf spring 44 is secured to arm 43 by rivet 45. An overcenter spring 46 is hingeably attached to the center about which it rotates, on end 47 of leaf spring 44. Overcenter spring 46 is attached, at its other end 48, to flexible metal strip 33, at end 49 thereof. The movement of end 49 of strip 33 is limited by projections 50 and 51 on base 11.

Ends 52 and 53 of bimetallic strips 35 and 36, respectively, are bent onto and thereby fixedly secured, by cooperation with notches 55 proximate the ends 52 and 53, to substantially rigid molded connecting link 56. Link 56 is preferably composed of a phenolic condensation product or some other substantially rigid, but electrically insulating material, in order that end 52 of bimetallic strip 35 will translate in correspondence to translation of end 53 of bimetallic strip 36, and also be electrically insulated therefrom. Link 56 has an aperture 57, allowing end 49 of flexible metal strip 33 to pass therethrough, but also having an edge 58 operable to abut against surface 59, proximate end 49 of flexible metal strip 33, on translation of link 56 towards engagement of edge 58 with surface 59.

Edge 60 of connecting link 56 is operable to engage end 61 of flexible metal strip 34, abutting it against projection 62 on base 11. Edge 63 on the end of connecting link 56 opposite to the end carrying the aforementioned edge 60, is operable to engage end 64 of flexible metal strip 31, and move it, after such engagement, in the direction of translation of the link 56 towards such engagement.

A right angle bracket 65 mounted on base 11 proximate end 64 of flexible metal strip 31. Arm 66 of bracket 65 projects under, and adjacent to, end 64 of flexible metal strip 31. Bracket 65 is operable to conduct electricity and is preferably made of copper. It is secured to base 11 by means of a rivet. A bracket 67 is mounted proximate end 61 of flexible metal strip 34, and carries an arm 68 passing above flexible metal strip 34 adjacent end 61 thereof. Bracket 67 is secured to base 11 by means of a rivet 69 and is electricity conductive, preferably made of copper.

A metal strip 70 is fixedly secured to bracket 65, by rivet 71 at one end 72 of strip 70. Strip 70, and rivet 71, are electrically conductive, being preferably made of brass and strip 70 is fixedly secured, to the base 11, by means of rivet 73, at the other end 74 thereof. Rivet 73 is electrically conductive and is preferably made of brass. Strip 70 acts as an electrical shunt, and its central portion 75 is closer to the base 11, than its ends 71 and 73, in order to provide an air space electrically insulating it from flexible metal strip 33 and bimetallic strips 35 and 36.

Bimetallic strip 36 has a cloth like plastic material 76 wound about it, insulating it from a length of wire 77. Wire 77 has a relatively small diameter with respect to other electrically conductive parts of the apparatus, and is wound about the insulating material 76 tightly, thereby providing means biasing the insulating material 76 to effect a secure contact with the bimetallic strip 36. Wire 77 is preferably long and has a small cross-sectional area in order to provide a relatively high electrical resistance to the passage of electrical current, in comparison to other electrically conductive parts of the apparatus. It is preferably wound about the insulating material 76 on bimetallic strip 36 in a single layer of coils spaced relatively close together in order that the heat, generated by the resistance of wire 77 to the passage of electrical current, can be readily conducted or radiated to the heat responsive portions of the apparatus. The plastic clothlike insulating material 76 is preferably composed of a material put together in such a manner that, although it provides electrical insulation between the wire 77 and the bimetallic strip 36, it allows the conduction and/or radiation of heat generated from the wire 77 to be communicated to metallic strip 36.

Portion 78, at one end of wire 77, is secured to strip 70 at end 73 thereof, by a rivet 73, and is electrically conductive therewith. Wire 77 is secured to bimetallic strip 36 at its other end proximate end 51 of bimetallic strip 36, and is electrically conductive therewith.

Metal strip 33 has beveled portions 79 which serve as stiffening means for the strip and to confine the flexing of the strip member to that portion adjacent its anchorage.

Metal strip 31 has a contact 80 fixedly secured thereto, proximate end 64 thereof, and is operable to be electrically conductive with arm 66 of bracket 65, when pressed into engagement therewith. The metal strip 31 is composed of a metal having leaf spring qualities, yieldably biasing contact 80 into electrical contact with arm 66.

The flexible metal strip 34 has a contact 81 fixedly secured thereon adjacent end 61 thereof and is composed of a metal having leaf spring qualities serving to yieldably bias contact 81 into engagement with arm 68.

The bimetallic strip 35 has a bushing 83 secured thereto, proximate end 52 thereof, and supports a contact 84 at end 85 thereof. Flexible metal strip 33 has an electrical contact 86 fixedly secured thereto, at end 49 thereof. Contacts 84 and 86 provide electrical communication between bimetallic strip 35 and flexible metal strip 33, when these contacts are engaged.

*Switch portions*

From the foregoing description, it can be seen that contact 80 and arm 66 are contacts of a switch 87 normally biased closed by flexible metal strip 31. Similarly, contact 81 and arm 68 of bracket 67 are operable to act as contacts of a switch 88 normally open, due to the limiting of flexible metal strip 34 against projection 62, thereby preventing arm 34 from biasing switch 88 into a closed position.

Bracket 67 is operable to be electrically communicating with terminal 23 by provision of an electrically conductive metal strip acting as a shunt, to be fixedly secured to, and electrically conductive with bracket 67 and the one of the brackets 25 of which terminal 23 is a projection, as shown to be shunt 89 in FIGURE 2.

It can be seen from the foregoing description, that contact 84 and contact 86 form a switch 90 which is normally biased open, due to the limiting of flexible metal strip 36 against projection 51 by overcenter spring 46, serving to prevent engagement of the contacts 84 and 86.

Circuit portions

Referring to FIGURE 4 there is a first circuit portion 91, operable to receive a source of electrical current, at terminals 21 and 23. From terminal 21 current is communicated through metal leaf spring 31 to contact 80 of switch 87. Arm 66, forming the other contact of switch 87, is connected by metal strip 70, acting as a shunt, to portion 78 of wire 77. The coiled portion of wire 77 acts as a heating element 92. Wire 77 communicates with electrical current flowing in bimetallic strip 36, which is responsive to the heat generated by the heater 92. Bimetallic strip 36 is electrically communicative with terminal 23 by means of two of the rivets 32 and electrically conducting spacers 39.

The second circuit branch 93, is operable to be connected to an electrical load hooked up at terminals 22 and 23. This second circuit, when closed, carries electrical current to terminal 22 from bimetallic strip 35 which is rigidly attached to terminal 22 by one of the rivets 32. Electrical current is transmitted from bimetallic element 35 through bushing 83 to contact 84, which is operable to be closed upon contact 86 of switch 90. From contact 86 of switch 90, electrical energy is transmittable through flexible metal strip 33 to terminal 23, to which flexible metal strip 33 is attached by electrically conductive rivets 32.

A branch of a third circuit 94, formed when shunt 89 is attached, thereby transmitting electrical energy from terminal 23 through shunt 89 to bracket 67. From bracket 67, electrical energy is transferred through switch 88, when switch 88 is closed, to flexible metal strip 34. From flexible metal strip 34, electrical energy is transmittable to terminal 24, to which flexible metal strip 34 is rigidly secured to and conductive with by means of one of the rivets 32.

Operation

The description of the operation of the time delay relay will be described with reference to the quiescent, or normal state of relationship between portions of the device previous to the application of electrical energy to the terminals thereof.

In the quiescent, normal, or preenergized state of the relay, circuit branch 91 is closed. Contact 80 is biased against arm 66 by flexible metal strip 31. Thus switch 87 is closed, and a closed path of electrical current is provided in circuit branch 91. Contact 86 is biased away from engagement with contact 84 by overcenter spring 46 limiting metal strip 33 against projection 51. Thus switch 88 is open and circuit branch 93 is open, thereby preventing the transmission of electrical energy therethrough. Contact 81 is prevented from being biased against arm 68 due to the deactuation of means provided for such biasing, to wit: flexible metal strip 34, and biased bimetallic strips 35 and 36 which force connecting link 56 therebetween to engage metal strip 34 and move it against projection 62.

When a source of electrical energy is connected to terminals 21 and 23, due to the closed condition of switch 87, current flows through circuit 91. Due to the electrical resistance of heater 92, being several orders of magnitude higher than the rest of the current carrying components of circuit 91, substantially all of the voltage drop across terminals 21 and 23 will be the voltage drop across the heater element 92. Due to the open condition of switches 88 and 90, no current will flow in circuit branches 93 and 94. After current is initially applied to terminals 21 and 23, due to its flow through wire 77, heater 92 will generate heat in response to passage of current therethrough. This heat will be transmitted to bimetallic member 36. In response to heat transmitted thereto, bimetallic member 36 will bend in an upward direction and carry link 56 along with it. As link 56 moves upwardly, it will disengage from metallic strip 34, allowing metallic strip 34 to bring contact 81 into engagement with arm 68, closing switch 88, and allowing electrical current to pass therethrough. As link 56 moves further upwardly, edge 58 thereon will engage metallic strip 33 and move it, together with spring 46 over center, upwardly. When overcenter spring 46 moves upwardly, metal strip 33 will be biased toward bimetallic member 35. However, since bimetallic member 35 has its end connected to the upward movement of bimetallic member 36 by link 56, contacts 84 and 86 will not come together at this point, and switch 88 will remain open.

As link 56 moves still further upward, its end 63 will engage metal strip 31, exerting a force on that strip opposite to the spring biasing within such strip, thereby disengaging it from arm 66 and opening switch 87. The opening of switch 87 will cause electrical current to cease flowing in circuit 91. At this point of operation, heater 92 will cease generating heat, and bimetallic members 35 and 36 will begin to cool.

As bimetallic members 35 and 36 cool, link 56 will move downwardly out of engagement with metal strip 31, allowing that strip to bias into engagement with arm 66. When contact 80 on metal strip 31 engages arm 66, switch 87 will be closed, and current flows again through circuit branch 91. Heater 92 again begins to generate heat, and in response thereto, bimetallic members 35 and 36 begin moving in an upward direction once again. As just described, bimetallic members 35 and 36 will move back and forth, causing link 56 to open and close switch 87, thus providing a voltage regulation of potential applied across circuit branch 91. This cycling will continue until the source of electrical energy is cut off from supply to terminals 21 and 23.

When the source of electrical energy is cut off from terminals 21 and 23, the cooling phase of the operation of the relay begins. In the cooling phase, heater 92 will no longer generate heat. Bimetallic members 35 and 36 will cool and move downwardly. As the downward movement progresses, bimetallic strip 35 will move into engagement with metal strip 33. Contacts 84 and 86 will come together closing switch 88, allowing current to flow through circuit branch 93. As the bimetallic members continue to cool, bimetallic strip 35 will exert increasing pressure between contacts 84 and 86, finally forcing metal strip 33, together with overcenter spring 46, downwardly and over center, respectively. As spring 46 moves over center, metal strip 33, carrying contact 84, will be biased away from the bushing extended contact 86 on bimetallic strip 35, opening switch 90, thus causing an open circuit condition in circuit branch 93.

As bimetallic members 35 and 36 move still further downwardly, link 56 engages metal strip 34, exerting a force on it opposite to the spring biasing force within metal strip 34, thus moving it away from engaging arm 68, thereby opening switch 88, and causing circuit branch 94 to be in an open circuit condition. At the end of the cooling phase, bimetallic strips 35 and 36 will be in their normal position, and link 56 will be forcing metal strip 34 against projection 62, holding switch 88 in an open condition.

From the foregoing description, it can be seen by various hookups of loads and sources of energy to terminals 21, 22, 23 and 24, various utilizations may be made of the time delay relay apparatus herein described for different circuit configurations. From the foregoing description, the operation of the device can be applied for a circuit to be turned on after the release of power from application to relay, as well as to a circuit to be normally on and subsequently turned off after the application of energy to the relay. Various combinations of the time conditioned on-off positions of the switches in the relay may be utilized within the scope of the invention herein described.

What I claim is:

1. A time delay relay apparatus comprising a first switch connectable to a first circuit and a second switch connectable to a second circuit, means generating heat in said first circuit in response to electric current passing therethrough, a first means biasing said first switch into a closed position, means thermally responsive to said heat generating means in engagement with and acting against said first biasing means to open said first switch; a second biasing means normally forcing said second switch to an open position and forcing said second switch towards a closed position in response to movement of said thermally responsive means; and a second thermally responsive means biasing said second switch to a closed position and subsequently acting to move said second biasing means to its normal biasing position opening said second switch; said first thermally responsive means disengaging from said first mentioned biasing means and returning toward engagement therewith responsive to initiation of cooling, said second thermally responsive means closing said second switch responsive to continued cooling.

2. The apparatus claimed in claim 1 wherein said first thermally responsive means is in series with said heat generating means in said first electrical circuit.

3. The apparatus claimed in claim 1 wherein said second thermally responsive means is in series with said second switch in said second electrical circuit.

4. The apparatus claimed in claim 1 wherein said second thermally responsive means moves towards closing the contacts of said second switch in response to movement of said first thermally responsive means after said first mentioned thermally responsive means has ceased exerting a force on said first mentioned biasing means and said first mentioned thermally responsive means being mechanically linked to said second mentioned thermally responsive means.

5. The apparatus claimed in claim 1 wherein said second biasing means comprises an overcenter spring and exerts bias towards opening said second switch in response to said overcenter spring being in its normal position wherein it exerts a moment in a first direction about its center, and biases said second switch towards closing wherein it exerts a moment about its center in a direction opposite to said first mentioned direction.

6. The apparatus claimed in claim 5 and means independent of the motion of said first mentioned thermally responsive means limiting the travel of said overcenter spring about its center.

7. The apparatus claimed in claim 1 and a third electrical switch, means biasing said third electrical switch into a closed position, and means mechanically linked to said first mentioned thermally responsive means normally acting against said third biasing means to open said first switch and being operable to release force acting against said third mentioned biasing means in response to said first thermally responsive means moving toward said first mentioned biasing means.

8. The apparatus claimed in claim 7 and means connecting a contact of said third mentioned switch to a common connection of said first and second thermally responsive means to a common source of electrical current.

9. The apparatus claimed in claim 1 wherein said first thermally responsive means and said second thermally responsive means are connected in common to a source of electrical current.

10. The apparatus claimed in claim 9 wherein substantially all of the voltage drop across said first mentioned circuit is across said heat generating means when said first electrical switch is closed.

11. The apparatus claimed in claim 1 and means thermally insulating said heat generating means and said first and second thermally responsive means from environment external to the apparatus.

12. The apparatus claimed in claim 11 wherein said first thermally responsive means has a shorter path of thermal conduction from said heat generating means than said second thermally responsive means.

13. The apparatus claimed in claim 12 wherein said first biasing means includes a flexibly yielding metal strip fixedly attached at one end to a terminal to which a source of electrical energy can be applied externally to said thermally insulating means.

14. The apparatus claimed in claim 13 wherein said flexibly yielding metal strip is in series with said first electrical circuit.

15. The apparatus claimed in claim 14 wherein said second biasing means includes a second flexibly yielding metal strip carrying a contact of said second switch and cooperable with said overcenter spring to open and close said second switch, said second flexibly yielding metal strip being in series with said second electrical circuit.

References Cited by the Examiner

UNITED STATES PATENTS

| | | | |
|---|---|---|---|
| 2,170,426 | 8/1939 | Raney | 200—138 |
| 3,033,086 | 10/1961 | Strobel et al. | 219—511 X |

FOREIGN PATENTS 555,919    4/1957    Belgium.

BERNARD A. GILHEANY, *Primary Examiner.*

L. A. WRIGHT, *Assistant Examiner.*